United States Patent
Evans et al.

(10) Patent No.: US 12,377,988 B2
(45) Date of Patent: Aug. 5, 2025

(54) MANAGING CONDENSATE DRAINAGE WITHIN CHILLED AIR DUCTWORK

(71) Applicant: B/E Aerospace, Inc., Winston-Salem, NC (US)

(72) Inventors: Samuel P. Evans, Aylesbury (GB); Nick Undricov, Milton Keynes (GB); Boryan Kashikov, Leighton Buzzard (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 628 days.

(21) Appl. No.: 16/571,682

(22) Filed: Sep. 16, 2019

(65) Prior Publication Data

US 2021/0323682 A1    Oct. 21, 2021

(51) Int. Cl.

| | |
|---|---|
| *B64D 11/04* | (2006.01) |
| *B64D 13/08* | (2006.01) |
| *F24F 13/08* | (2006.01) |
| *F24F 13/14* | (2006.01) |
| *F25D 21/14* | (2006.01) |
| *F25D 29/00* | (2006.01) |

(52) U.S. Cl.
CPC .............. *B64D 13/08* (2013.01); *B64D 11/04* (2013.01); *F24F 13/081* (2013.01); *F24F 13/082* (2013.01); *F24F 13/14* (2013.01); *F25D 21/14* (2013.01); *F25D 29/003* (2013.01)

(58) Field of Classification Search
CPC ....... B64D 13/08; B64D 11/04; F24F 13/081; F24F 13/082; F24F 13/14; F24F 13/08; F24F 13/06; F24F 13/22; F24F 13/222; F24F 2013/227; F25D 21/14; F25D 29/003; B60H 1/3233; B60H 1/32331; B60H 2001/00714
USPC ......................................................... 454/275
See application file for complete search history.

(56) References Cited

U.S. PATENT DOCUMENTS

| | | |
|---|---|---|
| 2,299,833 A | 10/1942 | Mader |
| 2015/0059378 A1 | 3/2015 | Burd |

(Continued)

FOREIGN PATENT DOCUMENTS

| | | |
|---|---|---|
| EP | 2769917 A2 | 8/2014 |
| GB | 2522040 A | 7/2015 |
| JP | H094916 A | 1/1997 |

OTHER PUBLICATIONS

Shirakawa, Nobusuke, JPH094916 Translation.pdf, "Indoor unit of air conditioner", Jan. 1997, pp. 1-15.*

(Continued)

*Primary Examiner* — Avinash A Savani
*Assistant Examiner* — Ryan L Faulkner
(74) *Attorney, Agent, or Firm* — Suiter Swantz IP (57) ABSTRACT

An air return duct and air return duct grille for a chiller in an aircraft galley has articulated slats that are biased to open during chilling cycles and close during defrost cycles. In the closed orientation, the articulated slats divert any condensate from the chiller to a collection hose; in the open orientation, the articulated slates allow unrestricted airflow. The articulated slats may include a passive biasing element to bias the articulated slats into an open or closed orientation as necessary. The air return duct may also include air return duct grills without articulated slates to allow unobstructed air flow when the articulated slats are in a closed orientation.

13 Claims, 7 Drawing Sheets

(56) References Cited

U.S. PATENT DOCUMENTS

2016/0007736 A1   1/2016   Burd
2017/0122647 A1*  5/2017   Burd ..................... B64D 13/08
2018/0093774 A1   4/2018   Truemper

OTHER PUBLICATIONS

Office Action for European Application No. 19216314.5 dated Jan. 26, 2022, 6 pages.

* cited by examiner

MANAGING CONDENSATE DRAINAGE WITHIN CHILLED AIR DUCTWORK

BACKGROUND

In many commercial passenger aircraft galleys with chilled trolley compartments, cold air is supplied by either a vapour cycle air-chiller or a cold liquid supplied air cooling unit. During cooling, moisture condenses on the evaporator and/or heat exchanger. Where food storage regulations require the trolley compartment temperatures to be maintained between 0° C. (32° F.) and 4° C. (39.2° F.), the will freeze, significantly restricting air flow through the chiller.

To defrost the heat exchanger and clear the excess moisture, the direction of the circulated air is reversed (and sometimes the cooling medium is reversed in the heat exchanger) and the moisture is blown out as condensate to be drained away into the aircraft's waste water system.

The effectiveness of reversing the airflow depends on the type of chilling unit, its location in relation to the galley structure, and the chilled air distribution ductwork design. Air cooling units designed to be installed within the trolley compartment, usually on the back wall of a double bay together with the air distribution ductwork, cannot use drip trays to dispose of condensate because placing a drip tray directly below the heat exchanger to collect the condensate would severely restrict airflow. In those cases, return air ductwork collects any water discharged during defrost; however, when airflow is reversed, water droplets can be ejected from the air inlet grilles of the return air ductwork that is then re-ingested during the next chilling cycle.

The increasing volume of moisture in a chilled compartment may exceed the capacity of the condensate drainage system to remove it in a single defrost cycle resulting in pooled water within the trolley compartments.

SUMMARY

In one aspect, embodiments of the inventive concepts disclosed herein are directed to an air return duct and air return duct grille for a chiller in an aircraft galley having articulated slats that are biased to open during chilling cycles and close during defrost cycles. In the closed orientation, the articulated slats divert any condensate from the chiller to a collection hose; in the open orientation, the articulated slates allow unrestricted airflow.

In a further aspect, the articulated slats include a passive biasing element to bias the articulated slats into an open or closed orientation as necessary.

In a further aspect, the air return duct also includes air return duct grills without articulated slates to allow unobstructed air flow when the articulated slats are in a closed orientation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an air return duct and air return duct grille for a chiller in an aircraft galley having articulated slats that are biased to open during chilling cycles and close during defrost cycles. In the closed orientation, the articulated slats divert any condensate from the chiller to a collection hose; in the open orientation, the articulated slates allow unrestricted airflow.

Figure 1:
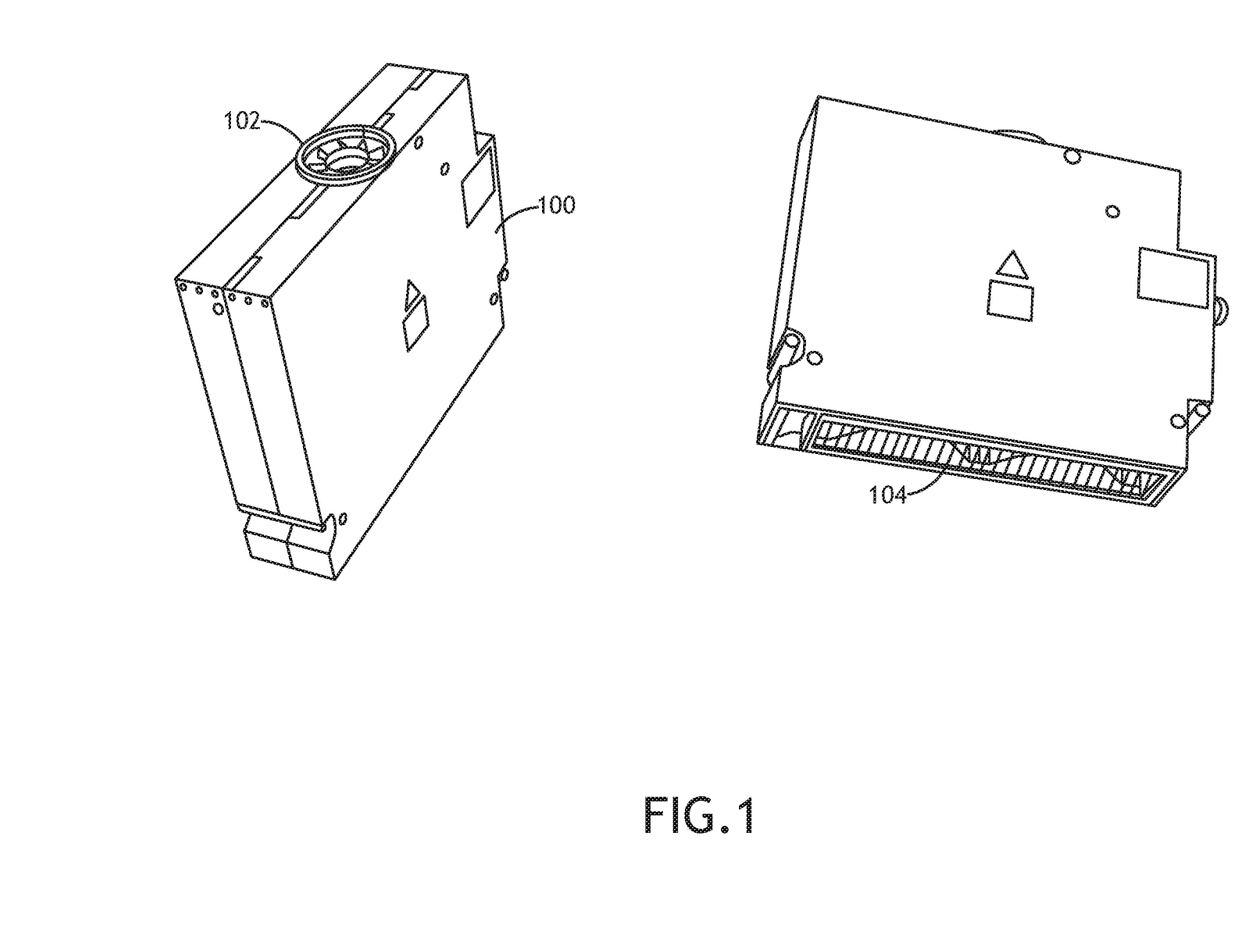
FIG. 1 shows perspective views of a chiller useful with embodiments of the inventive concepts disclosed herein.

Referring to FIG. 1, perspective views of a chiller 100 useful with embodiments of the inventive concepts disclosed herein is shown. The chiller 100 includes an air outlet 102 disposed on a top surface and an air inlet 104 disposed on a bottom surface. During normal operation, the chiller 100 may operate in a chilling cycle where air is drawn in through the air inlet 104, cooled within the chiller 100, and expelled from the air outlet 102 to cool the surrounding space or any area where the cooled air is ducted. In a defrost cycle, air flow is reversed so that air is drawn in through the air outlet 102 and expelled through the air inlet 104. Because frost buildup within the chiller 100 comes from ambient moisture, the air drawn back in through the air outlet 102 during the defrost cycle is generally dryer than the air that originally caused frost buildup and so does not contribute significantly to frost buildup. At least some of the condensate melted from the heat exchanger within the chiller 100 drips out of the air inlet 104 as the air inlet 104 is disposed on the bottom surface.

Figure 2A:
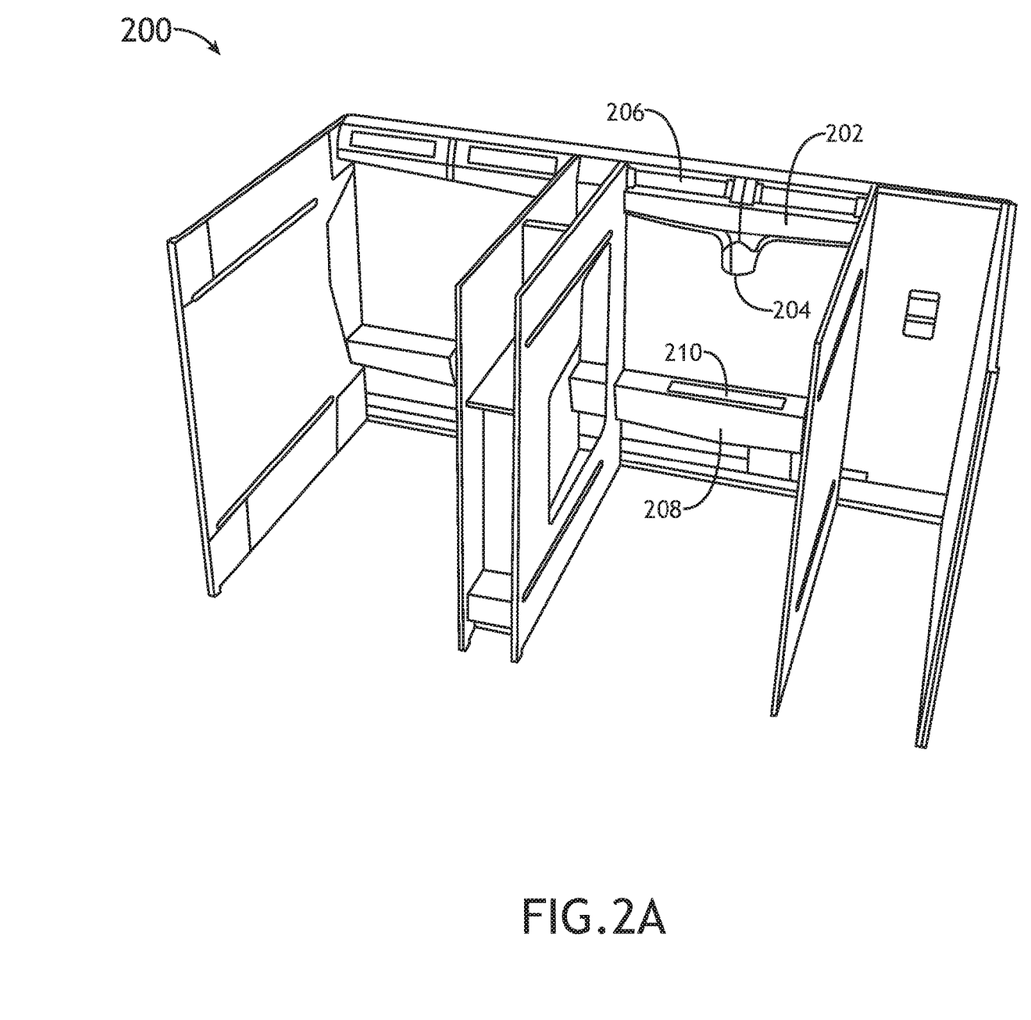
FIG. 2A shows a perspective view of a galley cart bay including embodiments of the inventive concepts disclosed herein.
Figure 2B:
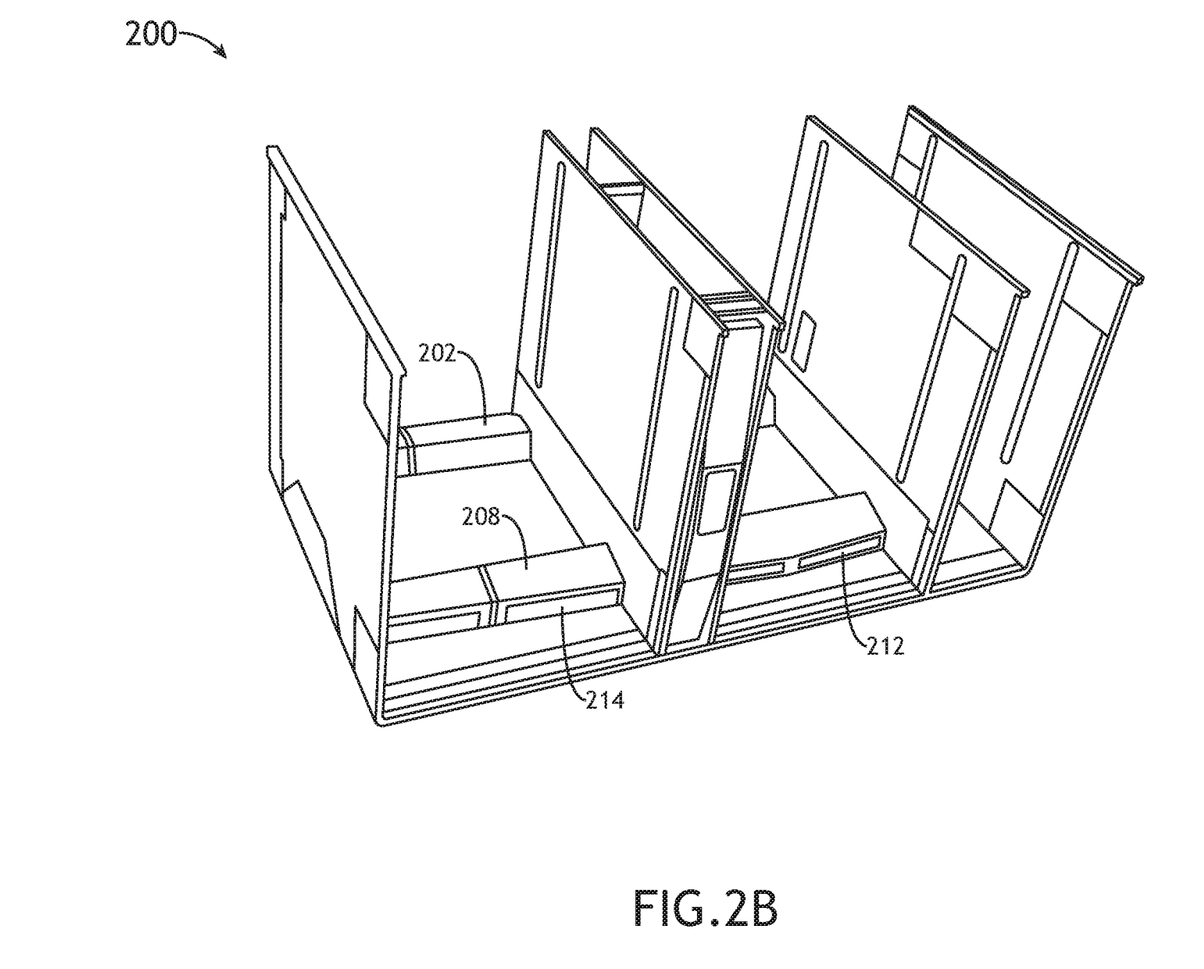
FIG. 2B shows a perspective view of a galley cart bay including embodiments of the inventive concepts disclosed herein.

Referring to FIGS. 2A-2B, perspective views of a galley cart bay 200 including embodiments of the inventive concepts disclosed herein are shown. The galley cart bay 200, adapted for chilled carts, comprises a chilled air outlet duct 202 having an outlet connection point 204 adapted to connect to the air outlet of a chiller; and defining one or more air supply outlets 206. The galley cart bay 200 also comprises an inlet duct 208 having an air inlet duct 208 having an inlet connection point 210 adapted to connect to the air inlet of the chiller.

The air inlet duct 208 defines one or more biasable chilled air return ports 212 disposed below the inlet connection point 210. In at least one embodiment, the air inlet duct 208 also defines one or more open chilled air return ports 214 disposed distal from the inlet connection point 210.

Figure 3A:
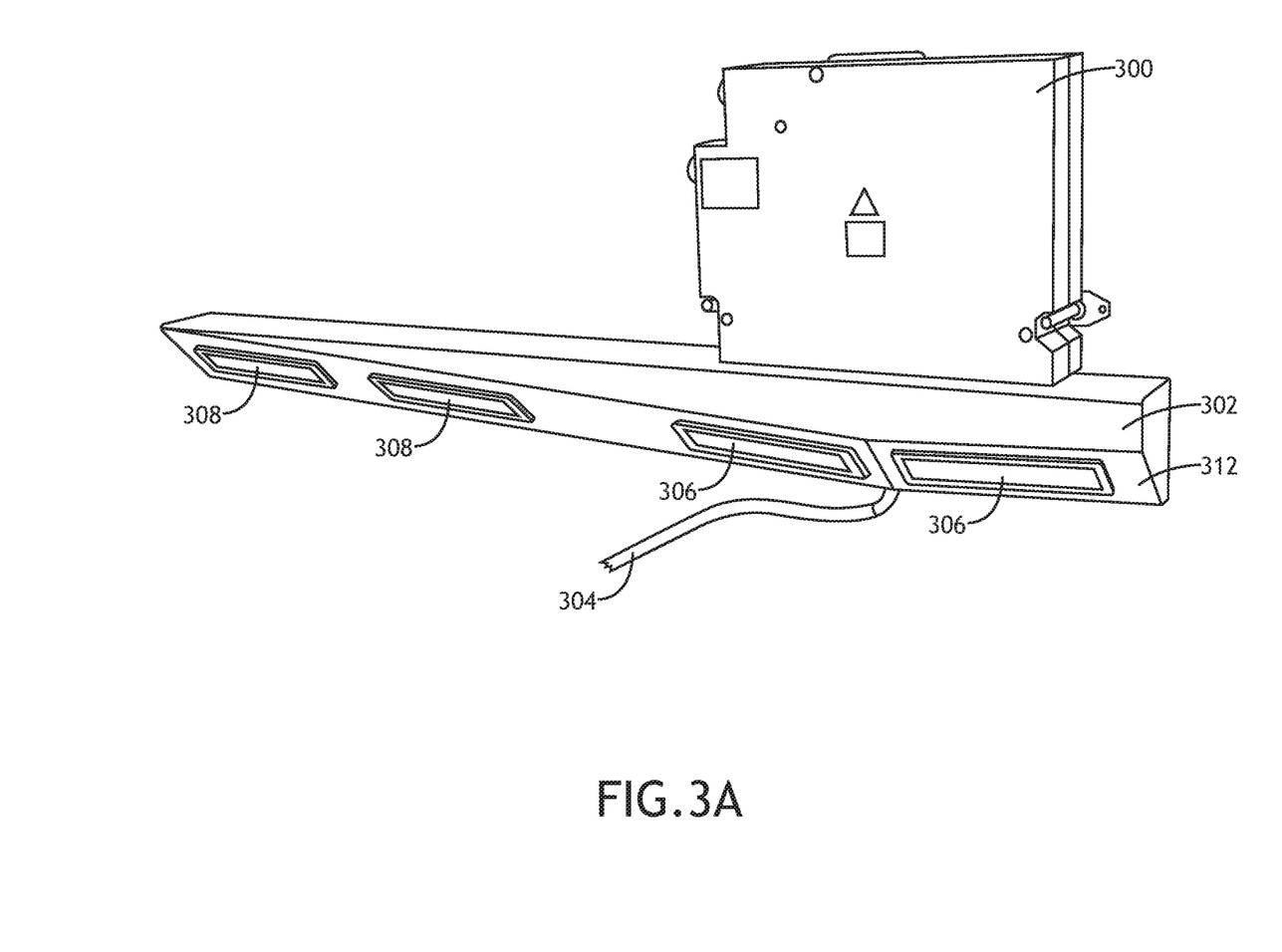
FIG. 3A shows a perspective view of a chiller and air inlet duct including embodiments of the inventive concepts disclosed herein.
Figure 3B:
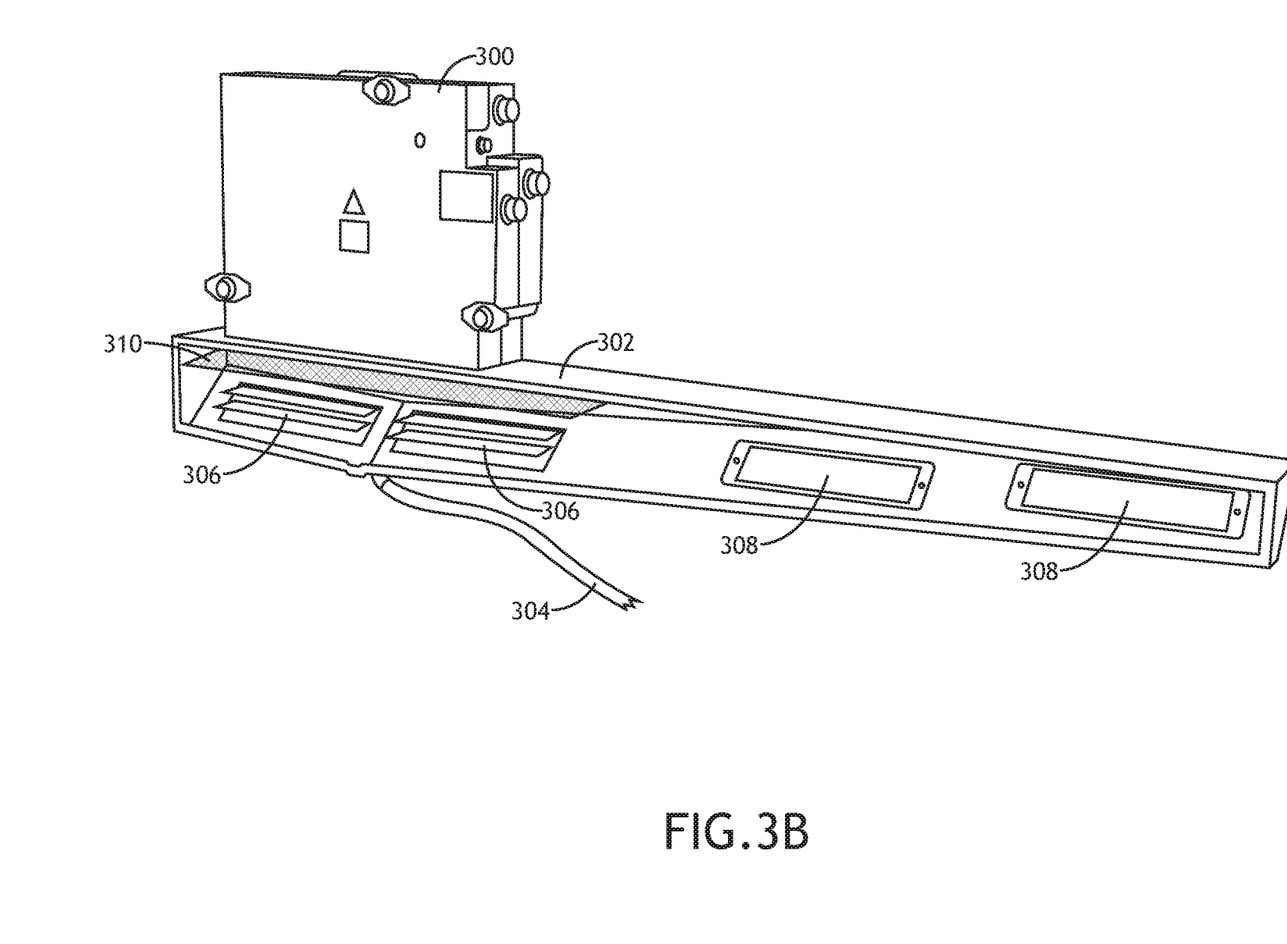
FIG. 3B shows a perspective view of a chiller and air inlet duct including embodiments of the inventive concepts disclosed herein.

Referring to FIGS. 3A-3B, perspective views of a chiller 300 and air inlet duct 302 including embodiments of the inventive concepts disclosed herein are shown. When a chiller 300 is operating in a defrost cycle, condensate from the chiller 300 is discharged via an air inlet in the bottom of the chiller 300 to drip into the air inlet duct 302 and be disposed of by a condensate hose 304 that drains the condensate into a waste water system. The air inlet duct 302 requires one or more air return ports 306, 308 to draw outside air into the chiller 300 during a chilling cycle and allow air to escape when operating in a defrost cycle.

The air return ports 306, 308 include at least one biasable air return port 306, and may include one or more open air return ports 308. The biasable air return ports 306, disposed beneath the chiller 300 and in line with a path of condensate dripping from the chiller 300 during a defrost cycle, include air return duct grills as described here. The open air return ports 308 may be completely open or may include a mesh configured to allow air to pass through but prevent intrusion by insects; or they may include a filtration system to prevent dust intrusion.

In at least one embodiment, air flow may be balanced across air return ports 306, 308, either in a chilling cycle or defrost cycle, via a baffle plate 310 disposed within the air inlet duct, below the chiller 300.

In at least one embodiment, the air inlet duct 302 comprises a slanted surface 312 configured to act as a condensate collector by generally angling the condensate hose 304.

In at least one embodiment, the biasable air return ports may also comprise a mesh to prevent bug intrusion when in an open orientation.

Figure 4:
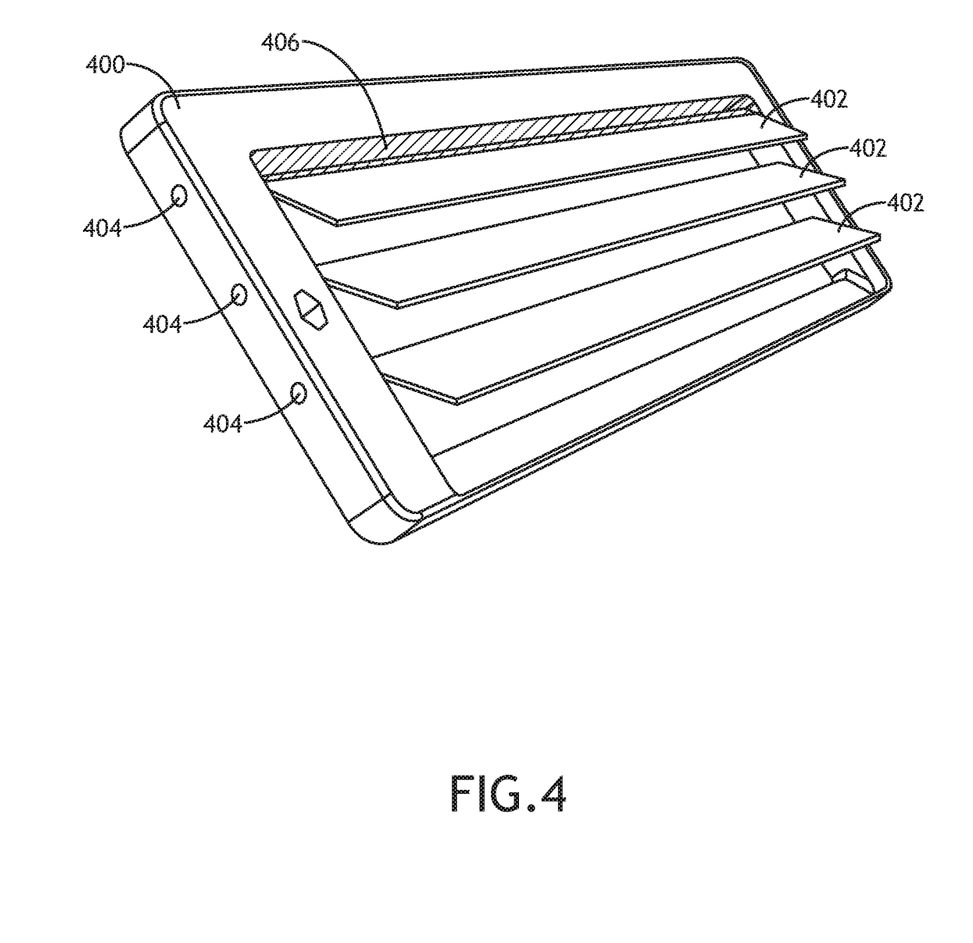
FIG. 4 shows a perspective view of an air return duct grille according to an exemplary embodiment of the inventive concepts disclosed herein.

Referring to FIG. 4, a perspective view of an air return duct grille 400 according to an exemplary embodiment of the inventive concepts disclosed herein is shown. An air return duct grille 400 includes articulated slats 402 configured to articulate about a corresponding pivot point 404. When installed in an inlet duct, the air return duct grille 400 is disposed and oriented such that the articulated slates 402 articulate into an open orientation when the chiller is operating in a chilling cycle, drawing air into the air inlet and reducing the air pressure within air inlet duct. In at least one embodiment, the articulated slats 402 articulate solely based on airflow due to the disparity in air pressure. In at least one embodiment, the articulated slats 402 are actively biased in an open orientation.

In at least one embodiment, the articulated slats 402 form a generally continuous surface when in a closed orientation to allow condensate to flow over the closed articulated slats 402 toward a condensate hose. In at least one embodiment, the air return duct grille 400 is disposed within the corresponding inlet duct at an angle such that condensate moves via gravity toward the condensate hose; for example, the air return duct grille 400 may be disposed in an angled surface of the inlet duct. Furthermore, the generally continuous surface is disposed to protrude from internal surface of the inlet duct sufficiently to prevent draining condensate from pooling near the air return duct grille 400.

In at least one embodiment, the articulated slats 402 are maintained in a closed orientation via gravity, air flow, and an air pressure disparity generated from the air inlet of a chiller during a defrost cycle. In at least one embodiment, the articulated slats 402 are actively biased into a closed position.

In at least one embodiment, each articulated slat 402 overlaps with the next lower articulated slat 402 to create a fluid seal. A gasket 406 disposed near the top of the air return duct grille 400 to create a fluid seal at an upper portion of the top-most articulated slat 402.

While embodiments shown herein generally show the air return duct grille 400 installed with the articulated slats 402 running horizontally, it is envisioned that the air return duct grille 400 may be installed with the articulated slats 402 generally disposed vertically if installed in a surface other than a slanted surface directly below the chiller.

Figure 5:
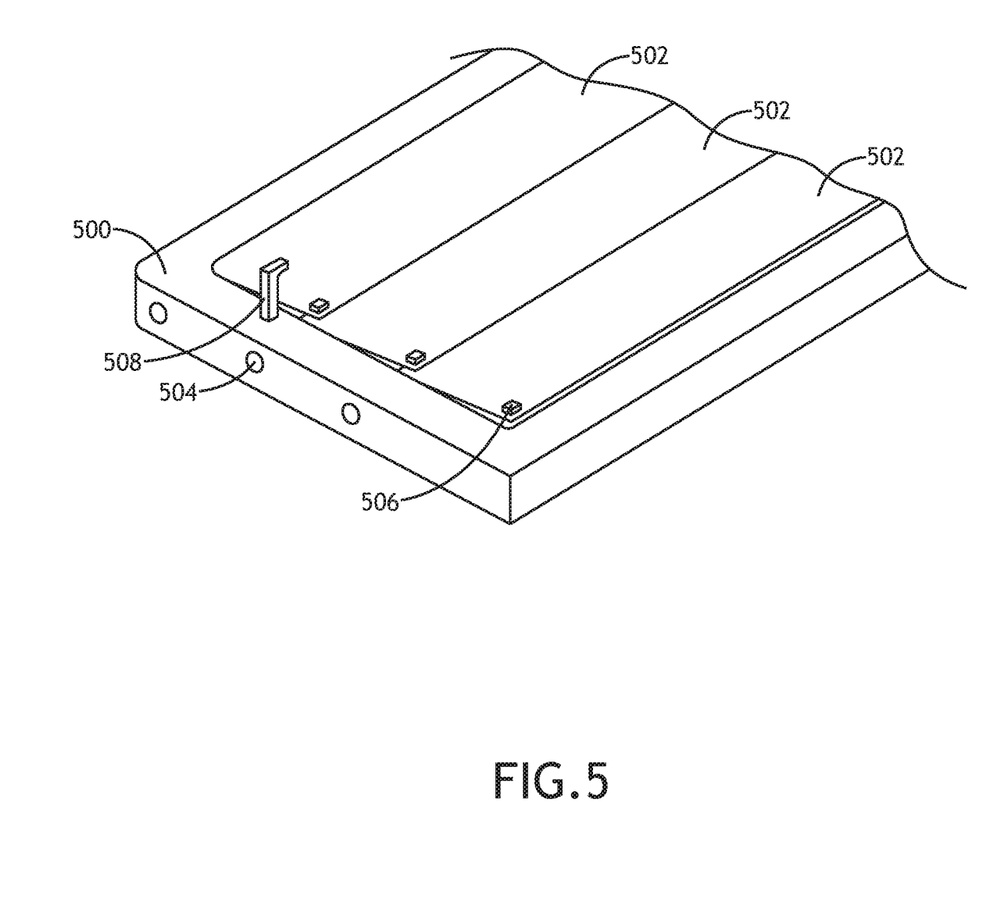
FIG. 5 shows a partial perspective view of an air return duct grille according to an exemplary embodiment of the inventive concepts disclosed herein.

Referring to FIG. 5, a partial perspective view of an air return duct grille 500 according to an exemplary embodiment of the inventive concepts disclosed herein is shown. The air return duct grille 500 includes a plurality of articulated slats 502, each configured to articulate about a corresponding pivot point 504. In at least one embodiment, each articulated slat 502 includes a slat weight 506 to bias the articulated slat 502 into a closed orientation. The slat weight 506 may be defined by the average air pressure disparity inside and outside the air inlet duct during a defrost cycle.

In at least one embodiment, the range of articulation of the articulated slats 502 is defined by at least one angle restrictor 508. The angle restrictor 508 prevents the articulated slats 502 from opening beyond a predefined point were the articulated slats 502 could pass a threshold where the articulated slats 502 would no longer close during normal operation.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An air return duct grille comprising:
   a plurality of partially overlapping articulated slats configured to produce a fluid seal when in a closed orientation during a defrost cycle;
   at least one slat weight disposed on each of the articulated slats configured to bias the corresponding articulated slat into a closed orientation, each slat weight defined by gravity, an air flow, and an average air pressure disparity inside and outside the air return duct grille during a defrost cycle; and
   at least one angle restrictor configured to prevent at least one articulated slat from opening beyond a predefined point when in an open orientation, wherein the predefined point comprises an angle beyond which the at least one articulated slat will not automatically close during normal operation,
   wherein the articulated slats are actively biased toward the open orientation, they form continuous surfaces in the closed orientation, and they protrude into an internal space of an air return duct to prevent condensate from pooling near the air return duct grille.

2. The air return duct grille of claim 1, further comprising an insect mesh.

3. The air return duct grille of claim 1, further comprising a gasket disposed proximal to an articulated edge of an upper-most articulated slat.

4. An air return duct comprising:
   a slanted surface configured to slant toward a condensate hose;
   at least two grilles, each comprising a plurality of partially overlapping articulated slats configured to produce a fluid seal when in a closed orientation disposed in the slanted surface;
   at least one slat weight disposed on each of the articulated slats configured to bias the corresponding articulated slat into a closed orientation, each slat weight defined by gravity, an air flow, and an average air pressure disparity inside and outside the air return duct during a defrost cycle;
   at least one open chilled air return port disposed in the slanted surface, distal from an inlet connection point defined by the air return duct; and
   a baffle plate disposed between the at least one grille and the at least one chilled air return port,
   wherein:
   the at least two grilles are disposed in an angled surface of the air return duct;
   the articulated slats are configured for a closed orientation when an air pressure disparity inside the air return duct and outside the air return duct is below a threshold;
   the articulated slats are configured to an open orientation when the air pressure disparity inside the air return duct and outside the air return duct is above the threshold;
   the baffle plate is configured to balance an air flow across the at least two grilles; and
   the articulated slats of the at least two grilles form continuous surfaces in the closed orientation, and protrude into an internal space of the air return duct to prevent condensate from pooling near the at least two grilles.

5. The air return duct of claim 4, wherein each of the at least two grilles further comprises at least one angle restrictor configured to prevent at least one articulated slat from opening beyond a predefined point when in the open orientation.

6. The air return duct of claim 4, further comprising an insect mesh.

7. The air return duct of claim 4, wherein each of the at least two grilles further comprises a gasket disposed proximal to an articulated edge of an upper-most articulated slat.

8. An aircraft galley comprising:
   a chilled air outlet duct defining an outlet connection point;
   an air return duct defining an inlet connection point, and comprising:
   a slanted surface configured to slant toward a condensate hose; and
   at least one grille comprising a plurality of partially overlapping articulated slats configured to produce a fluid seal when in a closed orientation disposed in the slanted surface;
   at least one slat weight disposed on each of the articulated slats configured to bias the corresponding articulated slat into a closed orientation, each slat weight defined by gravity, an air flow, and an average air pressure disparity inside and outside the air return duct during a defrost cycle;
   a chiller disposed between the outlet connection point and inlet connection point; and
   a condensate hose connected to the air return duct and an aircraft waste water system,
   wherein:
   the articulated slats are biased into a closed orientation when an air pressure disparity inside the air return duct and outside the air return duct is below a threshold; and
   the articulated slats are configured to an open orientation when the air pressure disparity inside the air return duct and outside the air return duct is above the threshold.

9. The aircraft galley of claim 8, wherein the at least one grille further comprises at least one angle restrictor configured to define a maximum deflection of at least one articulated slat when in the open orientation.

10. The aircraft galley of claim 8, further comprising an insect mesh.

11. The aircraft galley of claim 8, further comprising at least one open chilled air return port disposed in the slanted surface, distal from the inlet connection point.

12. The aircraft galley of claim 11, further comprising a baffle disposed between the at least one grille and the at least one chilled air return port.

13. The aircraft galley of claim 8, wherein the at least one grille further comprises a gasket disposed proximal to an articulated edge of an upper-most articulated slat.

* * * * *